March 24, 1931.    U. PAOLINI    1,797,672
APPARATUS FOR PREPARING INFUSIONS, PARTICULARLY FOR PREPARING COFFEE
Filed April 2, 1929
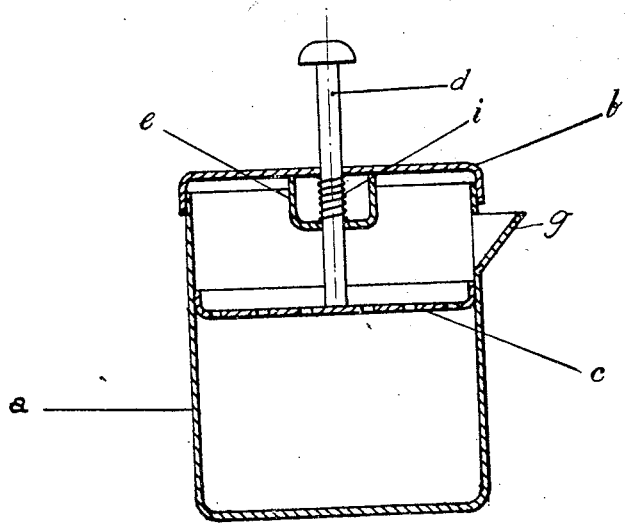
U. Paolini
INVENTOR
By: Marks & Clerk
Attys.

Patented Mar. 24, 1931

1,797,672

UNITED STATES PATENT OFFICE

UGO PAOLINI, OF MILAN, ITALY, ASSIGNOR OF ONE-HALF TO ATTILIO CALIMANI AND ONE-HALF TO GIULIO MONETA

APPARATUS FOR PREPARING INFUSIONS, PARTICULARLY FOR PREPARING COFFEE

Application filed April 2, 1929, Serial No. 351,937, and in Italy April 2, 1928.

This invention relates to an apparatus for preparing infusions, particularly for preparing coffee.

The invention is essentially characterized by a vessel adapted to contain a liquid, as f. i. water whereinto the substance to be infused, as for instance coffee in powdered form is poured with a slidable filtering member having a fit sufficiently tight within said vessel in such a manner that causing by suitable means the said member to slide towards the bottom of the vessel the infusion will be rapidly filtered to get it ready for use.

The annexed drawing shows only by way of example a manner of carrying out the invention. The single figure thereof shows a longitudinal section of the coffee machine.

On the drawing —a— shows the vessel, —b— the cover, —c— the movable filtering member formed with a rod —d— which forms the driving member for the filter. The said rod —d— is adapted for sliding within a guide —e— formed within the removable cover b and confining a spring i which frictionally embraces the rod d and retains the member c in adjusted position.

To prepare the coffee beverage, the water is boiled within the vessel a into which the ground coffee is poured, and the cover b is placed in position upon the vessel containing the water and coffee, the filtering member c having been previously adjusted to occupy a position adjacent the top of the vessel a. The rod d is subsequently lowered from the position shown in the drawing by pressure exerted on the exposed end of the rod d and the member c is moved downwardly toward the bottom of the vessel. In this manner the liquid passes through the filtering member c and may be poured from the vessel into cups without the removal of a cover b through a passage g, while the fully utilized solid substance of the coffee will remain trapped between the bottom of the vessel and the filter c, the spring i exerting sufficient braking effect upon the rod d to retain the filtering member in adjusted position.

What I claim and desire to secure by United States Letters Patent is:

A device for preparation of beverages, including a liquid containing vessel and a piston-like member fitted in the vessel and movable downwardly therein to confine solid substances in the bottom of the vessel, said member being formed of filtering material permitting the passage of liquid therethrough, a cover for the vessel, an actuating member for the piston-like member passing through said cover, and a spring coiled about the actuating member and confined by the cover, said spring acting to retain the piston-like member in adjusted position.

UGO PAOLINI.